July 14, 1936.  D. F. LYMAN ET AL  2,047,276
GAUGE FOR MEASURING THE SHRINK OR STRETCH IN A FILM STRIP
Filed Oct. 27, 1934
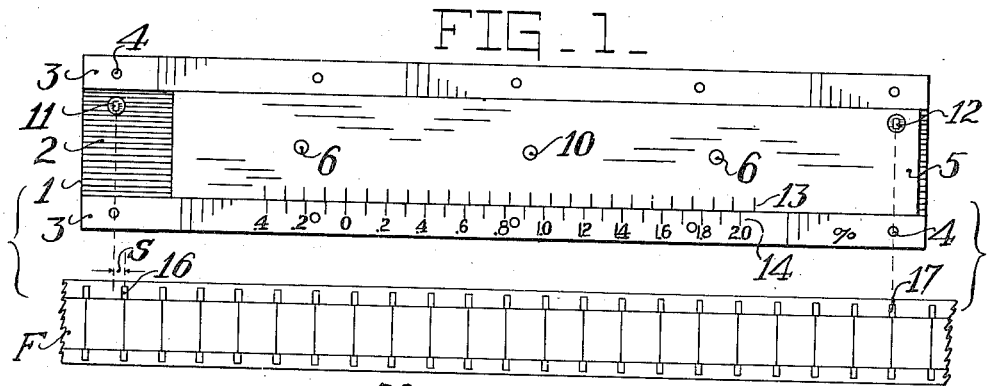
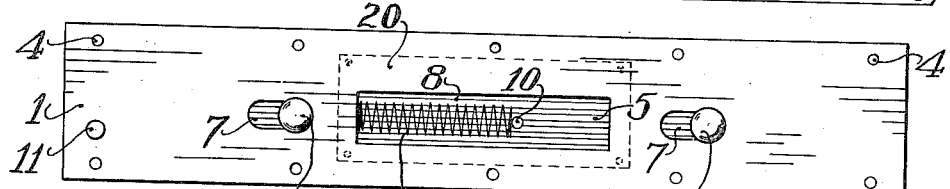
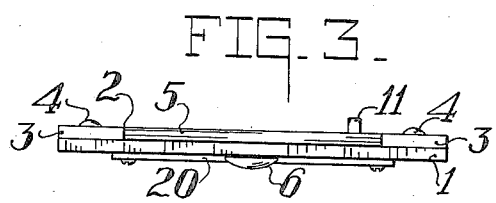
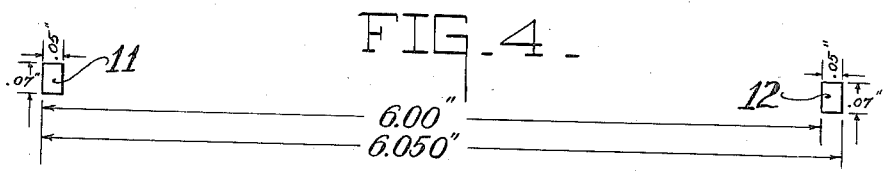
Inventors
Donald F. Lyman,
Lawrence R. Martin,
By
Attorneys Patented July 14, 1936

2,047,276

UNITED STATES PATENT OFFICE 2,047,276

GAUGE FOR MEASURING THE SHRINK OR STRETCH IN A FILM STRIP

Donald F. Lyman and Lawrence R. Martin, Rochester, N. Y., assignors to Eastman Kodak Company, Rochester, N. Y., a corporation of New York Application October 27, 1934, Serial No. 750,338

5 Claims. (Cl. 33—143)

This invention relates to photography and more particularly to a film gauge for measuring the shrinkage or stretch in a cinematographic film strip.

One object of this device is to provide a gauge for measuring the shrink or stretch in a cinematographic film in which a relatively uniform length is used as a basis for measuring variation regardless of the degree of shrinkage. Another object is to provide a measuring gauge on which the degree of shrinkage is measured directly on etched plates wherein the vernier principle of reading is used. And still another object is to provide a gauge for measuring the shrinkage in a cinematographic film in which the film being tested is measured under the same tension at all times. Other objects will appear hereinafter from the following specification, the novel features being pointed out in the claims at the end thereof.

To those skilled in the art it is a well known fact that cinematographic film may show a tendency to shrink with age or in rare cases it may show a slight stretch due to excessive use or processing. It will be readily understood that shrinkage or stretch in a moving picture film is very undesirable because it necessarily alters the space between the perforations of the film and causes misalignment between the perforations and the teeth of the sprocket which drives the film through the projector. A moving picture projector is capable of handling a certain amount of misalignment between the film perforations and the sprocket teeth without altering its performance appreciably, but a moving picture film has been known to shrink to the point where this misalignment has caused very unsatisfactory projection and even tearing of the perforations. Therefore, before using a film it is desirable to know whether it has shrunk, whether it is normal, or even stretched, and this invention is designed to perform this function easily, accurately, and directly in percent.

The novel characteristics that we consider characteristic of our invention are set forth with particularity in the appended claims. The invention itself, however, both as to its organization and its method of operation, together with additional objects and advantages thereof will best be understood from the following description of specific embodiments when read in connection with the accompanying drawing, in which, Fig. 1 is a plan view of the top of the film gauge having a piece of film in connection therewith in order to show the operation of the gauge;

Fig. 2 is a plan view of the bottom of the film gauge with the rear plate removed to show the assembly of the spring pressed slide;

Fig. 3 is an enlarged end elevation of the film gauge; and

Fig. 4 is a diagrammatic picture of the face of the film gauge to show the relation between the film gripping pins and the vernier scales for aiding anyone in understanding the construction and operation of the scales.

Like characters and references refer to corresponding parts in the several views.

Briefly, the invention embodies a channeled base plate having a spring pressed slide mounted in said channel by pin and slot connections. Two pins are provided for engaging the perforations of the film and holding it in position on the gauge, one being mounted on the base plate and the other mounted on the slide at a definite distance from the first. These two pins are continually pressed apart by the action of the spring pressed slide. The base plate and the spring pressed plate are each provided with scales which cooperate and read on the vernier principle to give the shrinkage or stretch of the film directly in percent.

The reference number 1 indicates a base plate which is channeled or on which a channel 2 is formed by two strips 3 which are fastened to the face of the base plate 1 by the rivets 4 as shown in Fig. 1 of the drawing. In this channel 2 the slide 5 is slidably mounted to the base plate 1 by means of the two pin and slot connections, 6 and 7 respectively, which also act to limit the path of travel of said slide 5. As shown in Fig. 2 the base plate 1 is recessed or slotted, as shown by 8, to accommodate spring pressing means for the slide 5. The slide 5 is continually pressed to the right by means of the spring 9 abutting one wall of the slot 8 and pressing against a pin 10 which is mounted on the slide 5 in such a way that it extends into the recess or slot 8 of the base plate 1. In the drawing a cover plate 20 is shown attached to the bottom of the base plate 1 to enclose the slot 8 in said plate and confine the spring 9 in its working position.

One pin 11, for engaging the perforations of the film to be measured, is fixed in the channel 2 of the base plate 1 and the other pin 12 is mounted on the slide 5 in line with and at a definite distance from pin 11. Therefore it can be understood from the above description and the drawing that these two film gripping pins 11 and 12 are spring pressed apart constantly due to the action of the spring 9 on the slide 5, and a film placed on these two pins is consequently always measured under the same tension.

The shrink or stretch in a film to be measured is read directly in percent by means of the scales 13 and 14 located on the slide 5 and the channel strip 3 respectively. The scales 13 and 14 are constructed in relation to each other and the distance between the film gripping pins 11 and 12 so that they co-operate to read on the vernier principle, and their reading of shrink or stretch is given directly in percent as will be clearly explained below.

Referring to Fig. 4 we see that when the scales 13 and 14 are set at zero the film gripping pins 11 and 12 are such a distance apart that the distance from the inside face of one pin 12 to the outside face of the other pin 11 is exactly 6 inches. These pins 11 and 12 are made to fit the perforations of the film tightly to eliminate any error occurring from any slack between the wall of the perforation and the face of the pin. The exact distance from the outside face of one pin to the outside face of the other pin will be six inches plus the width of the perforation which is .05" or 6.05" which is the measurement found in a normal film and on which basis the zero point of the scales is found. Therefore the standard relative length of film to be measured is approximately 6.05" measuring from the middle of one perforation to the middle of another perforation.

When a film is positioned on the two pins 11 and 12 any shrink or stretch in the same will be apparent between the outside edge of the perforation on the pin 11 and the inside wall of the perforation on pin 12 or over a distance of 6 inches, and it is in relation to this length that the calibrations of the vernier scales are constructed so as to read directly in percent. The calibrations on scale 13 are placed .156" apart while the calibrations on scale 14 are placed .150" apart. The difference between these two distances is .006" or .1% of 6". The stretch of film is indicated and measured when a line is aligned to the left of the zero mark and a shrink is likewise indicated and measured on the right of the zero mark. When the .1% shrink line is aligned the overall distance from the outside of pin 11 to the outside of the other pin 12 is 6.044" or the basic distance of 6" is reduced to 5.994". And, when the .1% stretch line is aligned the overall distance becomes 6.056" or the basic distance of 6" is 6.006".

To illustrate the operation of this film gauge reference will be made to Fig. 1. As shown in Fig. 1 a piece of film F is taken of such length that two perforations, 16 and 17 which are approximately 6.05" apart, will be included in its length. The slide 5 is then slid against the action of the spring so that these two perforations 16 and 17 can be placed on the pins 11 and 12 respectively. After the film is properly positioned on the pins 11 and 12 the slide 5 is released and film is put under a definite tension by the spring 9 acting on said slide. The scales are then read on the vernier principle to find which lines are aligned and the aligned lines will give the percentage shrink or stretch occurring in the film as shown on an exaggerated scale by s in Fig. 1.

This device possesses several advantages, one of which is the fact that a relatively uniform length of film is used as a basis of measuring variation regardless of the degree of shrinkage while other scales have a widely varying working base, that is, a varying length of film is used in judging stretch or shrink. Also the degree of shrinkage in the presented invention is measured directly on an etched scale, this scale being easier to read than the usual scale, because although it is not a true vernier, the vernier principle of reading is used. And finally the film being tested is measured under the same tension at all times, said tension being supplied by a built in spring actuating the slide.

Although we have shown and described certain specific embodiments of our invention we are fully aware that many modifications thereof are possible. Our invention, therefore, is not to be restricted except insofar as is necessitated by the prior art and by the spirit of the appended claims.

What we claim and desire to secure by Letters Patent in the United States is:

1. In a device for measuring the shrink or stretch in a film strip perforated throughout the combination of, a channeled base plate, a plate slidably mounted in said channel, pins mounted in said channel and on said slidable plate for engaging the perforations of and thereby for holding the film to be measured, means between the base plate and the slidable plate normally forcing said pins apart, and scales on the base plate and the slidable plate co-operating to measure the shrink or stretch of the film.

2. In a device for measuring the shrink or stretch in a film strip perforated throughout or the like the combination of, a channeled base plate, a plate slidably mounted in said channel, suitable gripping means for the film comprising pins for engaging the perforations of the film strip mounted in definite relation on the base plate and on the slidable plate, resilient means for forcing apart the gripping means on the base plate and the slidable plate, suitable stops mounted between the base plate and the slidable plate for limiting the travel of the slidable plate, and scales on the slidable plate and the base plate co-operating to read the shrinkage or stretch in the film strip directly.

3. A device for measuring the shrinkage or stretch in a film strip perforated throughout comprising a base plate, a channel formed on the face of said base plate, a plate slidably mounted in said channel, suitable gripping means for the film strip comprising pins for engaging the perforations of the film strip mounted in definite relation in the channel of the base plate and on the slide respectively, a resilient means constantly tending to force said gripping means apart and located between the base plate and the slide, means between the base plate and the slide for limiting the travel of the slide on the base plate, and scales on the slide and base plate co-operating to give the shrink or stretch in the film directly.

4. A device for measuring the shrinkage or stretch in a cinematographic film or the like comprising a base plate channeled to receive a slidable plate, pin and slot connections between the base plate and the slide for slidably mounting said slide in a restricted zone, pins located on the base plate and on the slide in definite relation for engaging the perforations of the film to be measured, resilient means between the base plate and the slide for forcing said pins apart, and suitable scales on the base plate and on the slide in definite relation to be read on the vernier principle, said reading giving the stretch or shrinkage of the film directly in percentage.

5. In a device for measuring the shrinkage or stretch in a cinematographic film strip or the like the combination of, a base plate, a channel formed in said base plate by two strips mounted on the face of said base plate, a plate slidably mounted in said channel, pins mounted in definite relation on the slide and base plate for engaging the perforations of a strip of film, means tending to force said pins apart, said means being located between the base plate and the slide, pin and slot connections between the slide and the base plate for limiting the travel of said slide, and suitable scales on the slide and the base plate reading on the vernier principle for measuring the shrinkage or stretch of the film directly in percentage.

DONALD F. LYMAN.
LAWRENCE R. MARTIN.